United States Patent [19]

Van Der Plas et al.

[11] Patent Number: 5,327,277

[45] Date of Patent: Jul. 5, 1994

[54] METHOD AND APPARATUS FOR DETERMINING EQUALIZATION DELAYS IN A TRANSMISSION SYSTEM AND RELATED APPARATUS

[75] Inventors: Gert Van Der Plas, Merchtem; Christiaan H. J. Sierens, Kontich; Denis J. G. Mestdagh, Brussels, all of Belgium

[73] Assignee: Alcatel N.V., Amsterdam, Netherlands

[21] Appl. No.: 893,210

[22] Filed: Jun. 2, 1992

[30] Foreign Application Priority Data

Jun. 4, 1991 [EP] European Pat. Off. ........ 91201355.4

[51] Int. Cl.$^5$ ...................... H04J 14/08; H04B 10/00
[52] U.S. Cl. ..................... 359/140; 359/158; 359/137; 359/161; 379/5; 324/76.35; 370/108
[58] Field of Search ............... 359/140, 137, 158, 161, 359/173; 379/5; 324/76.35, 76.36; 370/108

[56] References Cited

U.S. PATENT DOCUMENTS

| | | | |
|---|---|---|---|
| 3,899,738 | 8/1975 | Harzer | 379/5 |
| 4,845,735 | 7/1989 | Payne et al. | 379/5 |
| 4,963,816 | 10/1990 | Tsui et al. | 324/76.35 |
| 5,073,982 | 12/1991 | Viola et al. | 359/140 |

FOREIGN PATENT DOCUMENTS 2636482  3/1990 France ..................... 359/140

Primary Examiner—Richard E. Chilcot, Jr.
Assistant Examiner—K. Negash
Attorney, Agent, or Firm—Ware, Fressola, Van Der Sluys & Adolphson

[57] ABSTRACT

To determine the equalisation delay of a substation (S3), the main station (C) of a transmission system measures, during an initial coarse measurement, the time interval between the sending of a first ranging signal to the substation and the receipt of a reply signal. This reply signal has a frequency and amplitude substantially lower than the information signals sent by other substations (S1, S2) of the system to avoid interference therewith. During a subsequent fine measurement the main station measures the time interval between the sending of a second ranging signal and the receipt of a second reply signal having the same characteristics as the information signals. The other substations have to stop transmission of signals during an interval equal to the uncertainty time interval with which the equalisation delay was measured during the coarse measurement. To be able to apply this method, the receiver at the main station includes a device (A2) used to isolate the first reply signal from the information signals and to recognize (COR) them, and a processing unit (PU) to determine the equalisation delay.

18 Claims, 3 Drawing Sheets

METHOD AND APPARATUS FOR DETERMINING EQUALIZATION DELAYS IN A TRANSMISSION SYSTEM AND RELATED APPARATUS

TECHNICAL FIELD

The present invention relates to communications systems and more particularly to a method for determining equalisation delays in a transmission system.

BACKGROUND OF THE INVENTION

Such a method is already known in the art, e.g. from the article "A B_ISDN Local Distribution System based on a Passive Optical Network" by J. W. Ballance et al, Globecom '90, San Diego section 3.3, 2nd paragraph.

In this known method which is applied in a transmission system wherein an exchange end or main station is connected to a plurality of customer ends or substations via the cascade connection of a common optical fiber link and respective individual links, the equalisation delay also called delay compensation of a customer end is determined in the following way. The customer end is told by the exchange end to transmit a reply signal to the latter without delay compensation, whilst at the exchange end first the propagation delay of the customer end is measured and afterwards the delay compensation is determined by substracting this delay from the maximum propagation delay of the system.

A drawback of this method is that to avoid interference of the above mentioned reply signal with information signals transmitted by other customer ends over the common link, the latter ends have to stop transmission of information signals during a time interval at least equal to the maximum propagation delay of the system. In the mentioned article this delay is equal to the time equivalent of 71 asynchronous transfer mode cells which in fact gives only a minor reduction in the network throughput, but might result in an unacceptable jitter due to cell accumulation.

DISCLOSURE OF INVENTION

An object of the present invention is to provide a method for determining equalisation delays in a transmission system requiring only a reduced interruption in the transmission of information signals.

According to the invention this object is achieved by the provision of a method for determining a first equalisation delay to be used in a first substation of a transmission system including also at least a second substation, with a known second equalisation delay, and a main station which is coupled to said first and second substations via the cascade connection of a common link and respective individual first and second links, the first and second equalisation delays being such that when the sending of information signals to said main station by said first and second substations is delayed with their respective first and second equalisation delays, the propagation delays between said main station and each of said first and second substations and back are equal to a predetermined propagation delay, said method including the steps of executing a coarse measurement to determine for said first substation an intermediate equalisation delay with a first predetermined uncertainty time interval; and executing a fine measurement while the sending of information signals is interrupted at all substations, except the first one, for at least said first predetermined uncertainty time interval, said fine measurement taking into account said intermediate equalisation delay to determine said first equalisation delay with a second predetermined uncertainty time interval which is lower than said first predetermined uncertainty time interval.

According to this method, transmission of information signals has to be stopped during a time interval equal to the uncertainty time interval with which the intermediate equalisation delay is determined by the coarse measurement of the method. This uncertainty time interval is independent from the size of the transmission system and is much smaller than the maximum propagation delay of the system which, on the contrary, depends on the transmission system size. A reasonable value for the uncertainty time interval is, for example, the time equivalent of 2 cells in an asynchronous transfer mode system, whereas in the method described in the above mentioned article, transmission has to be stopped during the equivalent of 71 cells, as already mentioned.

Another object of the invention is to provide a transmission system which is particularly adapted to the application of the above method.

According to the invention this is achieved by the provision of a transmission system which includes a receiver with a differential amplifier having a first input to which is applied an input signal comprising said information signals and said first reply signal and whose output is coupled to a second input of said amplifier via separation means wherein said first reply signal is separated from said information signal and whose output is also coupled to a recognition circuit to recognize said first reply signal.

The above mentioned and other objects and features of the invention will become more apparent and the invention itself will be best understood by referring to the following description of an embodiment taken in conjunction with the accompanying drawing.

BEST MODE FOR CARRYING OUT THE INVENTION

Figure 1:
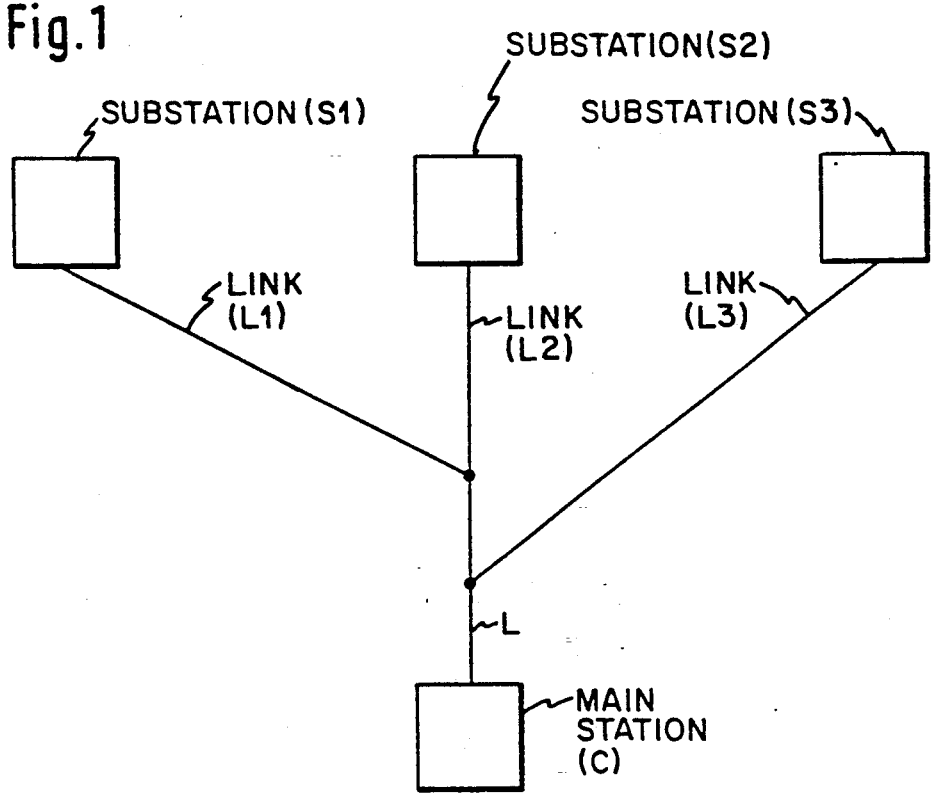
FIG. 1 is a schematic representation of a transmission system according to the invention and in which equalisation delays are determined by a method according to the invention.

FIG. 1 represents an optical transmission system operating according to the Asynchronous Transfer Mode and including a main station C which is connected to 3 substations S1 to S3 via the cascade connection of a common optical fiber link L and respective individual optical fiber links L1 to L3.

Figure 2:
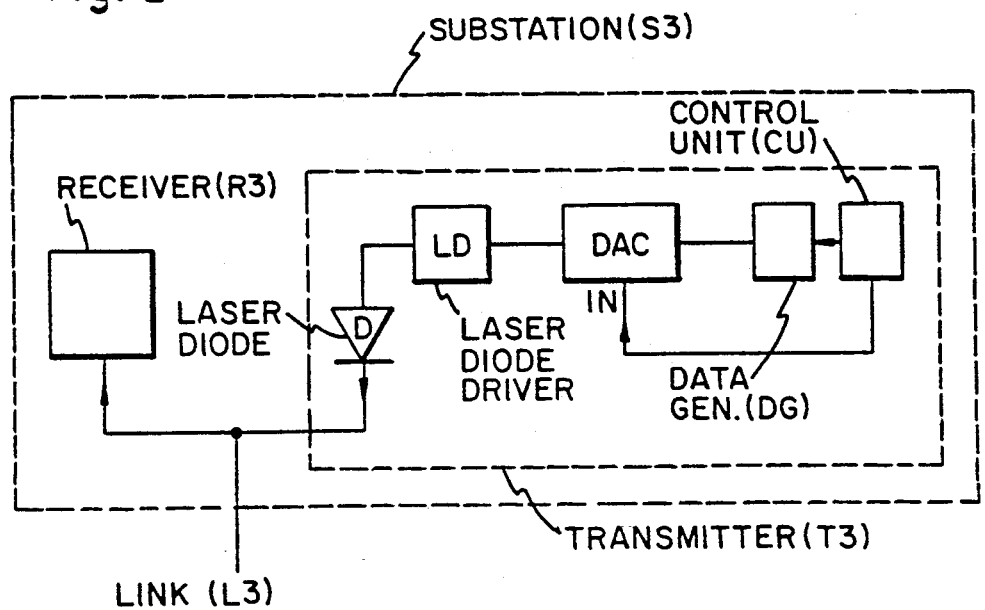
FIG. 2 represents substation S3 of FIG. 1 in more detail.

The substations S1 to S3 are all similar. One of them, namely S3 is represented in FIG. 2. It comprises an optical receiver R3 and an optical transmitter T3 both coupled to the individual optical fiber link L3.

The optical transmitter T3 comprises a digital-to-analog convertor DAC, e.g., of the type DAC0802 from National Semiconductor, the enable input of which is connected to the output of a data generator DG, generating either an information signal or a 15-bit maximal linear code sequence signal under control of a control signal generated at a first output of a control unit CU. A second output of the control unit CU is connected to a control input C of the digital-to-analog converter DAC and the output of the latter is connected to a laser diode driver LD. The output of the laser diode driver LD is connected to a laser diode L. The laser diode driver LD and the diode D are for instance of the type XMT1300-155 from British Telecom and Dupont de Nemours. The diode D is coupled to the optical fiber link L3.

The above mentioned maximal code sequence is the longest code that can be generated by a given shift register or delay circuit working in conjunction with an appropriate logic feeding back a logical combination of the state of two or more of its stages to its input. Maximal code sequence signals have specific properties which are useful in communication systems namely:

the number of ones minus the number of zeros in a sequence is equal to 1;

the statistical distribution of ones and zeros is well known and always the same;

autocorrelation of a maximal linear code is such that the correlation value, i.e., the number of corresponding bits of the signal minus the number of differing bits is equal to $-1$ when there is no match, i.e., when the signal is compared with a phase shifted replica of itself, and has a peak value in case of match; and a modulo-addition of a maximal linear code to a phase shifted replica of itself results in another replica with a phase shift different from either of the originals.

These signals are well known in the art and are for instance described in chapter 3 of the book "Spread Spectrum Systems" by Robert C. Dixon, 2nd edition 1984, edited by John Wiley and Sons, which also describes how such signals are generated.

Figure 3:
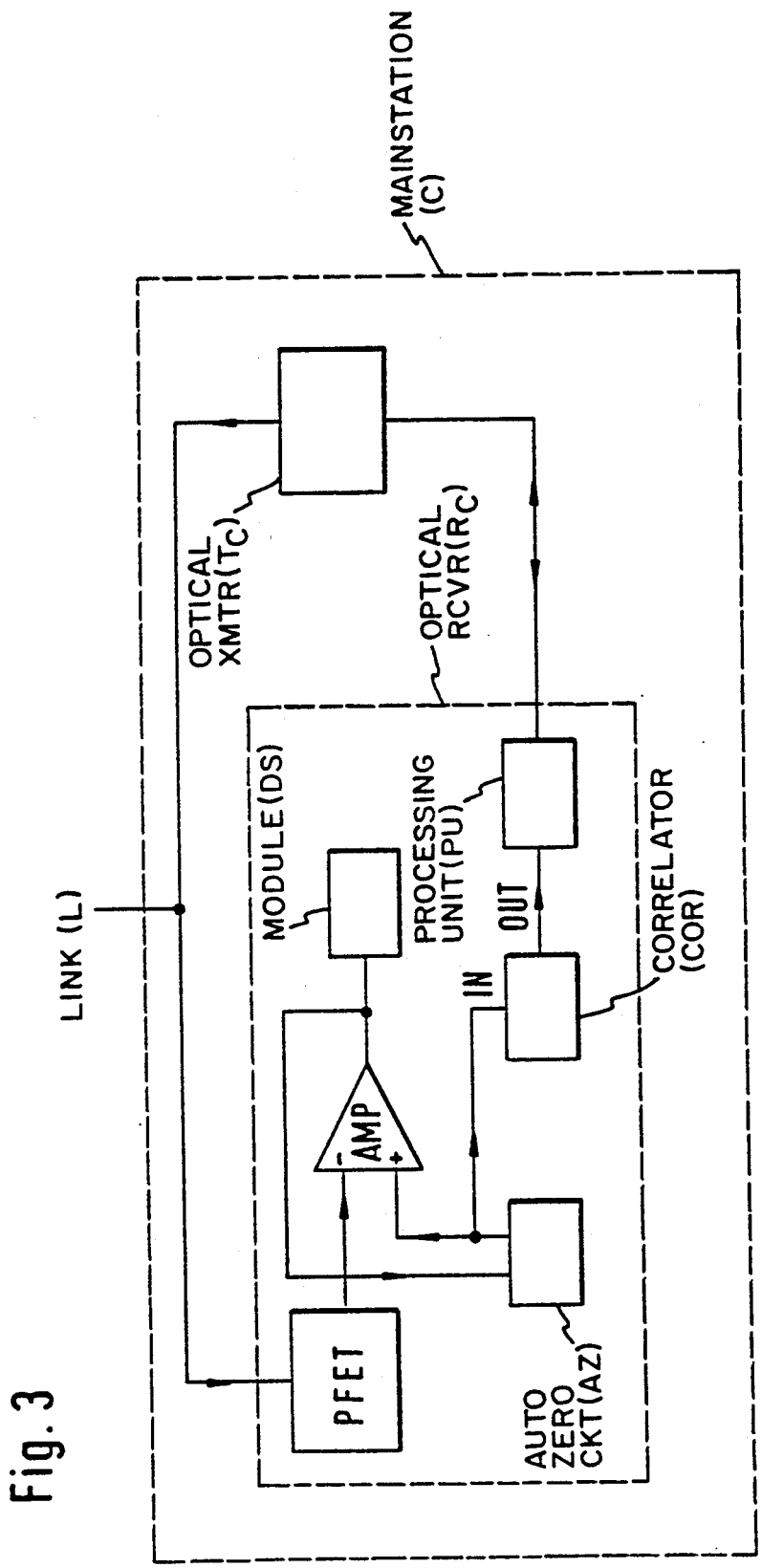
FIG. 3 shows the main station C of FIG. 1 in more detail.

The main station C is shown in more detail in FIG. 3. It includes an optical transmitter Tc and an optical receiver Rc both coupled to the optical fiber link L. The optical receiver Rc includes a pinfet circuit PFET, e.g. of the type LOPFO120 from Laser diode, which has an input coupled to the optical fiber link L and an output coupled to the non-inverting input of an operational amplifier AMP, e.g., of the type CLC520 from Comlinear Corporation. The output of the amplifier AMP is connected to an auto-zero circuit AZ, e.g. of the type LMC669 from National Semiconductor Corporation, and to a module DS where the signal is further processed depending on its destination. The output of the auto-zero circuit AZ is coupled to the inverting input of the amplifier AMP and to the input IN of a correlator circuit COR the output OUT of which is coupled to a processing unit PU connected to the optical transmitter Tc. The transmitter TC is not shown in detail. It differs slightly from the transmitter T3 described above in that it does not include a digital-to-analog convertor, i.e., its data generator is directly coupled to a laser driver (not shown).

The optical receivers R1 to R3 are also not shown in detail since they are well known optical receiver circuits.

Figure 4:
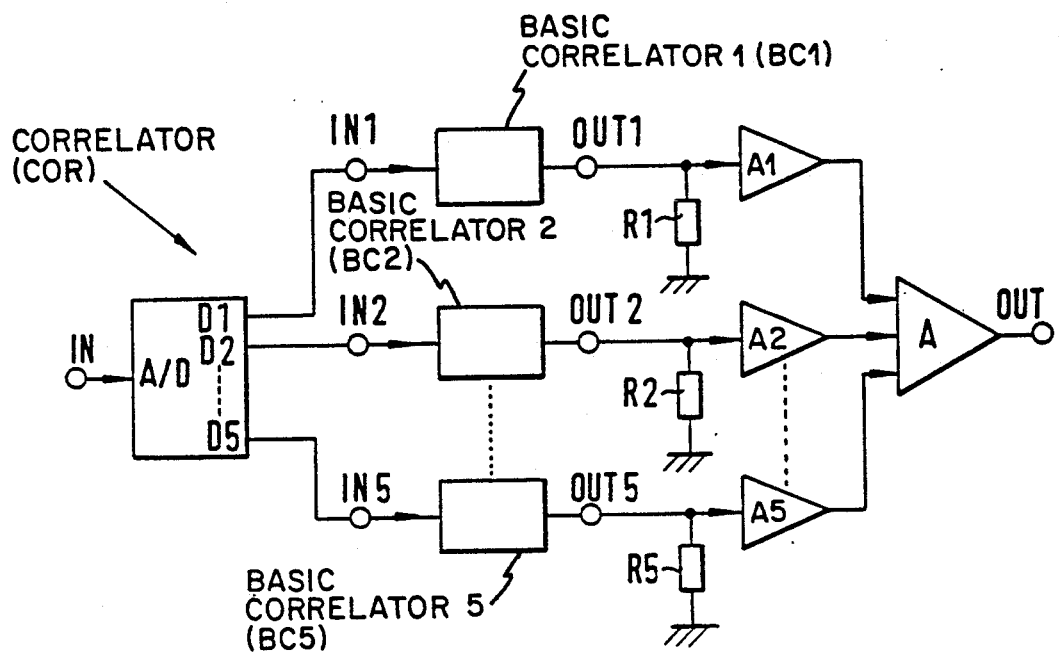
FIG. 4 is a block diagram of the correlator COR of FIG. 3.
Figure 5:
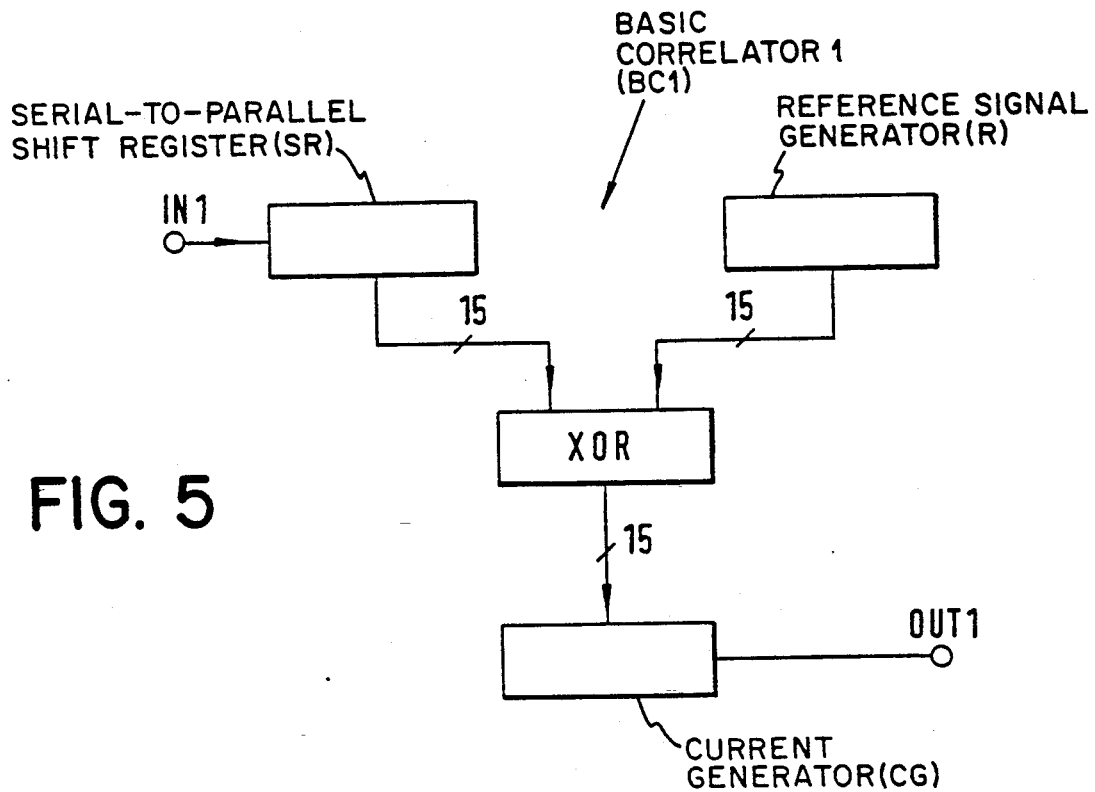
FIG. 5 is a block diagram of the basic correlator BC1 of FIG. 4.

Following is, with reference to FIGS. 4 and 5, a more detailed description of the correlator-(COR) of FIG. 3.

FIG. 4 represents a schematic diagram of this correlator COR. It comprises an analog-to-digital convertor A/D the input of which constitutes the input IN of the correlator COR and which has 5 outputs D1 to D5 each of which is connected to an input of an associated basic correlator circuit BC1/BC5, respectively. The output of each basic correlator circuit BC1/BC5 is connected to an input of a respective amplifier A1/A5 and to one end of a respective resistor R1/R5 whose other end is grounded. The outputs of the amplifier A1 to A5 are each connected to one input of an adder circuit A, the output OUT of which is the output OUT of the correlator COR.

One of the basic correlator circuits, i.e., BC1, is represented in relative detail in FIG. 5. It comprises a serial-to-parallel shift register (SR) the input of which is the input IN1 of the basic correlator and which has 15 outputs each of which is connected to an input of a respective one of 15 Exclusive-OR circuits represented by a block XOR.

The other inputs of the Exclusive-OR circuits are connected to a corresponding one of 15 outputs of a circuit R locally generating a reference signal which is identical to the 15 bit maximal linear code sequence signal generated by the data generator DG of the optical transmitter T3 (FIG. 2). The generation of maximal linear code signals is also described in chapter 3 of the earlier mentioned book and will not be described in detail.

The outputs of the Exclusive-OR circuits are each connected to a control input of a current generator CG whose output is the output OUT1 of the basic correlator BC1.

The transmitters of the substations S1 to S3 are each adapted to send optical information signals to the main station C at a bitrate of e.g. 150 Mb/s. These information signals are asynchronous transfer mode cells which are transmitted in timeslots assigned by the main station C.

Such a way of communication in assigned timeslots is well known in the art, e.g.) from the earlier mentioned article.

When sending information signals in the timeslots assigned to it, each substation has to make sure that these signals arrive at the main station in those assigned time slot and has therefore to take into account its proper propagation delay, i.e., the delay elapsing between the transmission of an invitation signal from the main station to the substation and the receipt in this main station of an information signal subsequently sent back by the station.

To achieve this, each substation delays the transmission of its information signals with an equalisation delay equal to the difference between the maximum propagation delay in the transmission system, i.e. the propagation delay of a substation situated at the maximum distance of the main station, and the propagation delay proper to the substation. In this way it looks as if all substations were located at a predetermined maximum distance from the main station.

A substation cannot start sending information signals as long as it does not know its equalisation delay.

Following is a detailed description of a method used to determine the equalisation delay of e.g. the substation S3 (FIG. 1), it being supposed that the equalisation delays of the substations S1 and S2 are already determined.

First a coarse measurement is performed.

In a first step the main station C sends a first so called ranging signal to the substation S3 via the transmitter TC (FIG. 3) and at the same time a control signal is sent by that transmitter to the processing unit PU of the receiver RC to start a counter (not shown) included in that processing unit. This counter is preset to a value equal to the maximum propagation delay of the system and starts decounting when triggered by the above mentioned control signal.

The ranging signal includes a command for the substation S3 to send upon receipt thereof an optical reply signal to the main station. This reply signal is a 15-bit maximal linear code sequence signal having a bit rate of 341 Kb/s and being generated by the data generator DG (FIG. 2) under control of the control unit CU. The generation of maximal linear sequence signals is described in the earlier mentioned book and will therefore not be explained in detail. The amplitude of the maximum linear code signal is adapted in such a way by the digital-to-analog convertor DAC under control of the control unit CU that the converted reply signal has an amplitude which is 10 dB lower than that of the optical information signals transmitted by the substations S1 and S2. In this way the digital-to-analog convertor DAC is not used to convert a digital signal to an analog one, but to adapt the amplitude of the digital signal applied to its enable input according to the control signal applied at its control input C. The output signal of the digital-to-analog convertor DAC is applied to the laser diode driver LD to modulate the amplitude of the optical signal produced by the laser diode D with that signal. The thus obtained modulated signal is transmitted to the main station C via the optical fiber links L3 and L. Since the reply signal has a low amplitude and a low bitrate compared to the amplitude and bitrate of the mentioned information signals, it does not interfere therewith, so that the stations S1 and S2 can continue sending information signals over the optical fiber L during the coarse measurement.

The optical reply signal is received at the main station C together with information signals sent by the stations S1 and S2. There they are applied to the input of the pinfet circuit PFET of the receiver RC (FIG. 3). The received signals are converted to an analog signal which is fed to the inverting input of the amplifier AMP. The signal provided at the output of the amplifier AMP is fed to the input of the auto zero circuit AZ. This circuit isolates the information signals from other low frequency signals, in this case the optical reply signal, received simultaneously therewith and of a possible DC offset caused by the amplifier AMP and generates at its output these other low frequency signals and DC offset which are applied to the non-inverting input of the amplifier AMP. In this way only the information signals are produced at the output of the amplifier AMP. These are further processed by the module DS. More details eoncerning the auto zero circuit AZ can be found in the data sheet of the used LMC669 circuit of National Semiconductor Corporation.

The output signal of the auto zero circuit AZ is also applied to the input IN of the correlator COR where it is compared with a reference signal which is identical to the 15 bit maximal linear code sequence signal to make sure that the isolated low frequency signal is indeed the reply signal.

This is done in the following way.

The above mentioned output signal is applied to the input IN of the analog-to-digital convertor A/D (FIG. 4) and is converted to a 5-bit digital signal of which the most significant bit is provided at its output D1 connected to BC1 via its input IN1, the second bit is provided at output D2 and connected to BC2 via its input IN2, and so on until the least significant bit which is provided at the output D5 connected to BC5 via its input IN5. Each of the basic correlators e.g. BC1 (FIG. 5) compares by means of the 15 Exclusive OR circuits XOR the values of 15 consecutive bits applied at its input IN1 with the values of the 15 bit maximal code sequence signal, generated by the circuit R. The outputs of the Exclusive-OR circuits control the current generator CG to produce for each control input a negative current with a fixed value for a one input value i.e. when there is no match of the compared bits, and a positive current with a fixed value for a zero input value, i.e. when there is a match of the compared bits. Due to the earlier mentioned characteristic of a maximal linear code sequence signal concerning autocorrelation the current produced at the output of the current generator and therefore at the output OUT1 of the basic correlator BC1 has a value equal to the above mentioned negative value when the reference signal is compared with a phase shifted replica of itself, a value equal to 15 times the above mentioned positive current in case of exact match and a value in between these two values in case of comparison with another signal.

In case of ideal transmission without distortion, comparison of the signal provided at the output D1 of the analog/digital convertor A/D with the reference signal would be sufficient to recognize the above mentioned first reply signal. However, due to distortion, there will not be an exact match. For this reason the signals produced at the other outputs D2 to D5 of the analog-to-digital convertor A/D are in addition compared with the reference signal by the basic convertors BC2 to BC5 respectively.

The resistances R1 to R5 are weighting resistances which have different values: R2 equals R1/2, R3 equals R1/4, R4 equals R1/8 and R5 equals R1/16. In this way a weight is assigned to the output signals of the basic correlators BC1 to BC5, the output signal of BC1 having the highest weight since this signal is the nearest to the expected result signal of the correlation. The output signals of the basic correlators are amplified by the respective amplifiers A1 to An and added by the adder A.

The output signal of the correlator COR has a triangular form. It is applied to the input of the processing unit PU (FIG. 3) to stop the earlier mentioned counter (not shown) included therein. The processing unit PU then determines the elapsed time interval which is equal to the equalisation delay of the substation S3 and communicates this delay to the substation S3 via the transmitter TC, over the optical fiber links L and L3, and via the receiver R3.

When more than one substation reacts upon the mentioned first ranging signal, a corresponding number of reply signals is received by the main station C within a time interval equal to the maximum propagation delay of the system. In that case no equalisation delay is determined and communicated to the substations. The main station goes on periodically sending ranging signals and the substations which did not receive their determined equalisaiton delay each skip a local random number of ranging signals before replying. In this way the possibility of two substations sending a reply signal on the same ranging signal is much lower. This means however that after receipt of a first reply signal, the main station has to wait for a time interval equal to the maximum propagation delay of the system before determining the related equalisation delay and sending the value of that delay to the concerned substation.

The uncertainty time interval with which the equalisation delay of the subscriber S3 is determined is equal to the uncertainty time interval with which the mentioned counter is stopped. This interval is determined by the base width of the triangle pulse. In the considered system this width is equal to the time equivalent of 2 cells. Thus the equalisation delay of the substation S3 is determined with a resolution of plus/minus 1 cell.

In order to determine a more accurate equalisation delay a fine measurement is executed.

To this end a second ranging signal is sent from the main station C to the substations S1 to S3 via the transmitter TC (FIG. 3) while starting the decount of a second counter (not shown) clocked with the system clock (also not shown) and preset at a value which is equal to the maximum propagation delay of the system plus the coarse equalisation delay of the substation S3 plus the time equivalent of one cell. Upon receipt of this signal each of these substations S1 and S2 is allowed to continue the sending of information signals for a time interval equal to its equalisation delay. Afterwards transmission is inhibited for a period equal to the mentioned uncertainty period of 2 cells.

Upon receipt of the second ranging signal, the substation S3 waits for a time interval equal to the previously determined coarse equalisation delay plus 1 cell and then transmits a second reply signal to the main center C with the same signal characteristics as the information signals. As a consequence the second reply signal is transmitted over the common fiber link L in a time slot laying within a time interval of 2 cells during which none of the substations S1 or S2 sends information signals. Indeed, by stopping transmission after their respective equalisation delay has elapsed, the substations S1 and S2 act as if they were located at a maximum distance from the main station where they together stop transmission at an instant T. Likewise, by waiting for a time interval equal to its previously determined intermediate equalisation delay plus 1 cell before sending the alternative reply signal the substation S3 acts as if it were also located at the maximum distance where it sends that reply signal at the time equivalent of 1 cell after the instant T. Since the intermediate equalisation delay of substation S3 has a resolution of plus/minus 1 cell and since the second reply signal is sent in the middle of the wait time of 2 cells, it is transmitted over the common link L within the timeslot of 2 cells during which the other substations S1 and S2 stopped their transmission.

The second reply signal received by the main station is processed in the same way as an information signal while the above mentioned second counter (not shown) is stopped. The uncertainty time interval with which the equalisation delay is determined in this fine measurement is not determined by the uncertainty time interval with which the counter is stopped since this interval is very small, but by the resolution of the counter which corresponds to the resolution of the clock with which the counter is clocked, i.e. plus/minus 1 bit. Thus a more accurate equalisation delay of the substation S3 is obtained. It has to be noted that as well the intermediate as the accurate equalisation delay of the substation S3 could be determined by the latter. To make this possible, the main station C has to send an acknowledgement signal to the substation S3 upon receipt of the first reply signal during coarse measurement, or of the second reply signal during fine measurement. The intermediate and accurate equalisation delays can then be determined by the substation S3 from the time of sending the first, respectively second reply signal, the time of receiving the first, respectively second acknowledge signal and the maximum propagation delay of the system.

The equalisation delay of substation S3 could be measured in one step with the same accuracy as by the fine measurement part of the method by using the known method of measuring the time interval between the sending of a ranging signal from the main station to the substation S3 and the receipt of a reply signal with the same signal characteristics as the information signal. However, in that case the other substations S1 and S2 have to stop sending information signals during at least the maximum propagation delay of the system to avoid interference between those information signals and the reply signal.

While the principles of the invention have been described above in connection with specific apparatus, it is to be clearly understood that this description is made only by way of example and not as a limitation on the scope of the invention.

We claim:

1. Method for determining a first equalisation delay to be used in a first substation (S3) of a transmission system including also at least a second substation (S1/S2), with a known second equalisation delay, and a main station (C) which is coupled to said first and second substations via the cascade connection of a common link (L) and respective individual first (L3) and second (L1/L2) links, the first and second equalisation delays being such that when the sending of information signals to said main station (C) by said first (S3) and second (S1/S2) substations is delayed with their respective first and second equalisation delays, the propagation delays between said main station (C) and each of said first (S3) and second (S1/S2) substations and back are equal to a predetermined propagation delay, said method including the steps of executing a coarse measurement to determine for said first substation an intermediate equalisation delay with a first predetermined uncertainty time interval; and executing a fine measurement while the sending of said information signals is interrupted at all substations, except the first one, for at least said first predetermined uncertainty time interval, said fine measurement taking into account said intermediate equalisation delay to determine said first equalisation delay with a second predetermined uncertainty time interval which is lower than said first predetermined uncertainty time interval.

2. Method according to claim 1, wherein said coarse measurement includes the steps of:

sending a first ranging signal from said main station (C) to said first substation (S3);

sending, upon receipt of said first ranging signal by said first substation (S3), a first reply signal from said first substation (S3) to said main station (C), said first reply signal being such that it does not interfere with said information signals;

receiving, isolating and recognizing said first reply signal at said main station (C);

determining at said main station (C) an intermediate equalisation delay for said first substation (S3) based on the time of sending said first ranging signal, the time of recognising said first reply signal and said predetermined propagation delay, said intermediate equalisation delay being determined with a first predetermined uncertainty time interval.

3. Method according to claim 2 wherein said fine measurement includes the steps of:
sending a second ranging signal from said main station (C) to said first (S3) and second (S1/S2) substations;
sending a second reply signal from said first substation (S3) to said main station (C), starting a time interval equal to said intermediate equalisation delay plus half of said uncertainty time interval after the receipt of said second ranging signal at said first substation (S3);
interrupting during at least said first predetermined uncertainty time interval the sending of said information signals at said second substation (S1/S2), starting a time interval equal to said second equalisation delay after the receipt of said second ranging signal at said second substation;
determining said first equalisation delay based on the time of sending said second ranging signal, the time of receiving said second reply signal at said main station (C) and said predetermined propagation delay.

4. Method according to claim 2 wherein said fine measurement includes the steps of:
sending a second ranging signal from said main station (C) to said first (S3) and second (S1/S2) substations;
sending a second reply signal from said second substation (S3) to said main station (C), starting a time interval equal to said intermediate equalisation delay plus half of said uncertainty time interval after the receipt of said second ranging signal at said first substation (S3);
interrupting during at least said first predetermined uncertainty time interval the sending of said information signals at said first substation (S1/S2), starting a time interval equal to said second equalisation delay after the receipt of said second ranging signal at said second substation;
sending upon receipt of said second reply signal at said main station a second acknowledge signal to said first substation (S3);
determining at said first substation (S3) said first equalisation delay based on the time of sending said second reply signal, the time of receiving said second acknowledge signal and said predetermined propagation delay.

5. Method according to claim 2, wherein said first reply signal is a signal having a frequency and an amplitude such that said first reply signal does not interfere with said information signal.

6. Method according to claim 1, wherein said transmission system is an optical transmission system.

7. Method according to claim 1, wherein said predetermined propagation delay is the maximum propagation delay of said transmission system.

8. Method according to claim 1 wherein said coarse measurement includes the steps of:
sending a first ranging signal from said main station (C) to said first substation (S3);
sending upon receipt of said first ranging signal by said first substation (S3) a first reply signal from said first substation (S3) to said main station (C), said first reply signal being such that it does not interfere with said information signals;
receiving, isolating and recognizing said first reply signal at said main station (C);
sending upon receipt of said first reply signal by said main station (C) a first acknowledge signal to said first substation (S3);
determining at said first substantion (S3) an intermediate equalisation delay for said first substation (S3) based on the time of sending said first reply signal, the time of receiving said first acknowledge signal and said predetermined propagation delay, said intermediate equalisation delay being determined with a first predetermined uncertainty time interval.

9. Method according to claim 8, wherein said fine measurement includes the steps of:
sending a second ranging signal from said main station (C) to said first (S3) and second (S1/S2) substations;
sending a second reply signal from said first substation (S3) to said main station (C), starting a time interval equal to said intermediate equalisation delay plus half of said uncertainty time interval after the receipt of said second ranging signal at said first substation (S3);
interrupting during at least said first predetermined uncertainty time interval the sending of said information signals at said second substation (S1/S2), starting a time interval equal to said second equalisation delay after the receipt of said second ranging signal at said second substation;
determining said first equalisation delay based on the time of sending said second ranging signal, the time of receiving said second reply signal at said main station (C) and said predetermined propagation delay.

10. Method according to claim 8, wherein said fine measurement includes the steps of:
sending a second ranging signal from said main station (C) to said first (S3) and second (S1/S2) substations;
sending a second reply signal from said first substation (S3) to said main station (C), starting a time interval equal to said intermediate equalisation delay plus half of said uncertainty time interval after the receipt of said second ranging signal at said first substation (S3);
interrupting during at least said first predetermined uncertainty time interval the sending of said information signals at said second substation (S1/S2), starting a time interval equal to said second equalisation delay after the receipt of said second ranging signal at said second substation;
sending upon receipt of said second reply signal at said main station a second acknowledge signal to said first substation (S3); and
determining at said first substation (S3) said first equalisation delay based on the time of sending said second reply signal, the time of receiving said second acknowledge signal and said predetermined propagation delay.

11. Method according to claim 8, wherein said first reply signal is a signal having a frequency and an amplitude such that said first reply signal does not interfere with said information signal.

12. A main station (C) in a transmission system having a first substation (S3) with a first equalization delay to be determined and at least a second substation (S1/S2) with a known equalization delay, said main station comprising:
 a transmitter ($T_c$) for providing a first ranging signal; and
 a receiver ($R_c$) having a differential amplifier (AMP) having a first input to which is applied an input signal comprising information signals and a first reply signal sent by said first substation (S3) in reply to said first ranging signal and whose output is coupled to a second input of said amplifier via separation means (AZ) wherein said first reply signal is separated from said information signals and whose output is also coupled to a recognition circuit (COR) to recognize said first reply signal.

13. A main station according to claim 12, wherein said recognition circuit comprises a correlator (COR) to correlate said first reply signal with a reference signal and to produce at its output a result signal indicative of the result of said correlation.

14. A main station according to claim 13, wherein said first reply signal has a predetermined format which is such that the result signal at the output of said correlator is a one-pulse signal when said first reply signal is recognized.

15. Apparatus for determining a first equalization delay to be used in a first substation (S3) of a transmission system including also at least a second substation (S1/S2), with a known second equalization delay, and a main station (C) which is coupled to said first and second substations via the cascade connection of a common link (L) and respective individual first (L3) and second (L1/L2) links, the first and second equalization delays being such that when the sending of information signals to said main station (C) by said first (S3) and second (S1/S2) substations is delayed with their respective first and second equalization delays, the propagation delays between said main station (C) and each of said first (S3) and second (S1/S2) substations and back are equal to a predetermined propagation delay, said apparatus comprising:
 means for sending a first ranging signal to said first substation (S3) and for responding to a first reply signal sent by said first substation (S3) in response to said first ranging signal for coarsely determining an intermediate equalization delay with a first predetermined uncertainty time interval and for providing a second ranging signal between said main station (C) and said first and second substations (S1/S2/S3); and
 means responsive to a second replay signal provided by said first substation (S3) to said main substation (C) in response to the second ranging signal for determining, in a fine measurement, while the sending of said information signals is interrupted at all substations, except the first one, for at least said first predetermined uncertainty time interval, said fine measurement taking into account said intermediate equalization delay to determine said first equalization delay with a second predetermined uncertainty time interval which is lower than said first predetermined uncertainty time interval.

16. The apparatus of claim 15, wherein said apparatus includes a receiver (RC) with a differential amplifier (AMP) having a first input to which is applied an input signal comprising said information signals and said first reply signal and whose output is coupled to a second input of said amplifier via separation means (AZ), wherein said first reply signal is separated from said information signal and whose output is also coupled to a recognition circuit (COR) to recognize said first reply signal.

17. The apparatus of claim 16, wherein said recognition circuit comprises a correlator (COR) to correlate said first reply signal with a reference signal and to produce at its output a result signal indicative of the result of said correlation.

18. The apparatus of claim 17, wherein said first reply signal has a predetermined format which is such that the result signal at the output of said correlator is a one-pulse signal when said first reply signal is recognized.

* * * * *